(12) United States Patent
Staplin (10) Patent No.: US 8,597,027 B2
(45) Date of Patent: Dec. 3, 2013

(54) DYNAMIC OBJECT-BASED ASSESSMENT AND TRAINING OF EXPERT VISUAL SEARCH AND SCANNING SKILLS FOR OPERATING MOTOR VEHICLES

(76) Inventor: Loren J. Staplin, Allentown, PA (US)

( * ) Notice: Subject to any disclaimer, the term of this patent is extended or adjusted under 35 U.S.C. 154(b) by 749 days.

(21) Appl. No.: 12/592,487

(22) Filed: Nov. 25, 2009

(65) Prior Publication Data

US 2011/0123961 A1    May 26, 2011

(51) Int. Cl.
*G09B 9/04* (2006.01)
(52) U.S. Cl.
USPC .............................................. 434/65; 434/69
(58) Field of Classification Search
USPC .................. 434/62–71, 322–365; 348/159; 351/200; 715/810; 345/156, 173; 709/231
See application file for complete search history.

(56) References Cited

U.S. PATENT DOCUMENTS

| | | | |
|---|---|---|---|
| 5,618,179 A * | 4/1997 | Copperman et al. | 434/69 |
| 2002/0161909 A1* | 10/2002 | White | 709/231 |
| 2009/0181349 A1* | 7/2009 | Harkness | 434/69 |

OTHER PUBLICATIONS

HPT.pdf—<http://www.driving-test-success.com/hazard/hazard_perception_main.html> confirmed via webpage.org as being available as of at least Oct. 12, 2007 → <http://web.archive.org/web/20071012092302/http://www.driving-test-success.com/hazard/hazard_perception_main.html>.*

* cited by examiner

*Primary Examiner* — Timothy A Musselman
(74) *Attorney, Agent, or Firm* — Sanford J. Piltch (57) ABSTRACT

The present invention is a method and system to permit assessment and measurement of a combination of visual and cognitive processes necessary for safe driving-object detection, by recognition of particular objects as actual or potential safety hazards or traffic hazards, through the continuous switching of visual attention between and among objects while virtually driving, according to an object's instantaneous priority as a safety threats or traffic hazard, that together are termed expert search and scanning skills. The present invention will reference the driver's performance against that of acknowledged experts in this skill; and then provide precise feedback about the type, location, and timing of search and scanning performance errors, plus remedial strategies to correct such errors.

7 Claims, 6 Drawing Sheets

DYNAMIC OBJECT-BASED ASSESSMENT AND TRAINING OF EXPERT VISUAL SEARCH AND SCANNING SKILLS FOR OPERATING MOTOR VEHICLES

FIELD OF THE INVENTION

The present invention relates generally to the measurement of a driver's proficiency in performing a learned behavior essential to safe motor vehicle operation, and more particularly to the measurement of deficits in a driver's awareness of vehicular and non-vehicular objects that deserve priority for recognition and attention during the continuous visual search and scanning of the roadway environment while driving.

BACKGROUND OF THE INVENTION

Driving is a risky and demanding activity in which a person is constantly called upon to avoid potential threats and hazards. Hazard avoidance, a learned behavior, relies upon a number of underlying visual and perceptual processes that must be accomplished in a timely and effective manner. Persons skilled in the art distinguish the detection of objects in and near one's travel path, recognition of which objects pose the greatest potential threats, the fixation of attention upon the highest priority safety threats, and attention shifting between those safety threats, on a dynamic and continuous basis, as a minimum set of activities that must be accomplished to exercise proper vehicle control to avoid hazards while driving. A driver characteristic signifying the proficient performance of these activities, in the aggregate, is referred to herein as "expert search and scanning skills," or 'ES3.'

Drivers who are legally operating their vehicles may exhibit ES3 deficits either because of impairment resulting from the onset of acute or chronic medical conditions or diseases, or more advanced stages of normal human aging; or because of inexperience with the driving task, as is the case with young, novice drivers who have not yet fully learned which objects deserve priority as potential threats. It may be demonstrated that skills lost due to impairment, or not fully learned due to inexperience, can be improved through training.

Research by Government agencies and by non-profit organizations has produced "model" curricula for driver training. When addressing crash avoidance, such model curricula consistently emphasize the importance of visually searching and scanning the scene while driving, rapidly directing and re-directing attention to recognized safety threats to anticipate the need to adjust speed or to maneuver the vehicle before a routine response becomes an emergency. Effective and affordable tools for measuring proficiency in such visual search and scanning skills are presently lacking.

To date, the training and assessment of driver's visual search and scanning skills that takes place outside of an actual car (or high-fidelity driving simulator) has employed either (1) static images (including drawings, diagrams, photographs, and slides); (2) computer graphics images; or (3) film or video images of roadway scenes. The limitations of the first two categories include, respectively, the absence of the dynamic qualities of moving traffic; and a "cartoonish" image quality that does not faithfully represent the appearance or the dynamic qualities of real-world threats and hazards encountered while driving. The limitations of the third category include the nature of the driver's involvement with the training process, characterized either by (1) passively watching (and not interacting with) the training materials, or (2) interacting with the film or video images based on a memory of what was seen instead of on a "real time" basis, as the images are immediately perceived by the driver; both, as a consequence, fail to measure instantaneous shifts of attention in the driver's visual search and scanning process, as directed to threat/hazard identification, and this aspect of performance as manifested under the actual conditions of driving cannot be precisely monitored and recorded. This, in turn, severely limits the ability to provide accurate feedback about deficits in a driver's search and scanning process, and to identify appropriate remedial strategies. All categories are limited in the specificity with which feedback about a driver's search and scanning performance and performance errors can be provided.

The present invention will overcome the noted limitations by utilizing proprietary computer software and commercially available, off-the-shelf hardware to implement a tabletop system. This system will provide the user with dynamic and realistic views of actual driving scenes; a means of tracking and scoring the user's skill in performing visual searching, identifying objects associated with traffic hazards or threats, switching attention from one object to another according to their instantaneous priority as hazards or threats relative to other objects visible in the driving scene, on a continuous basis; and a means of providing feedback that identifies the type, location, and timing of driver errors in search and scanning performance. Together, these system capabilities will permit assessment and training in expert search and scanning skills, an entirely new and relevant measure of driver performance that was not possible using earlier devices.

SUMMARY OF THE INVENTION

The present invention describes a method and system to permit measurement of a combination of visual and cognitive processes necessary for safe driving—object detection, recognition of particular objects as actual or potential traffic hazards, and the continuous switching of visual attention between objects while driving according to their instantaneous priority as traffic hazards that together are termed expert search and scanning skills.

The assessment and training system of the present invention consists of a central processing unit (CPU), a graphics card or chip set connected to the CPU, an internal hard drive connected to the CPU, a monitor or display unit connected to the CPU, and a mouse or other pointing device connected to the CPU. The computer may be either a desktop or a laptop computer that would lend the system portability, providing that the display of the laptop computer is sufficiently large to require the user to refixate his/her attention from the center of the viewing area to the periphery on a continuing basis; all from a predetermined fixed viewing distance.

Using proprietary computer software and off-the-shelf commercially available hardware the present invention will measure a driver's skill in visually searching and scanning the roadway environment, rapidly directing and re-directing attention to objects in or near the travel path according to their priority as threats or hazards; reference the driver's performance against that of acknowledged experts in this skill; and then provide precise feedback about the type, location, and timing of search and scanning performance errors, plus remedial strategies to correct such errors.

Drivers may be deficient in expert search and scanning skills because of impairment related to disease or aging, or because of inexperience. Therefore, an object of the present invention is to provide a method and system for dynamic object-based assessment and training of expert visual search and scanning skills for operating motor vehicles that overcomes such deficiencies and is both effective and feasible to implement.

A further object of the present invention is to provide a method and system for dynamic object-based assessment and training of expert visual search and scanning skills for operating motor vehicles that offers feedback to the user about the type, location and timing of the user's search and scanning performance deficiencies and errors.

Yet another object of the present invention is to provide a method and system for dynamic object-based assessment and training of expert visual search and scanning skills for operating motor vehicles that offers remedial strategies to correct the user's errors.

Other objects will appear hereinafter.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENT

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

The present invention is a method, and system for carrying out the method, to permit measurement of a combination of visual and cognitive processes necessary for safe driving-object detection, while at the same training a user in the recognition of particular objects as actual or potential traffic hazards, and the continuous switching of visual attention between objects while driving according to their instantaneous priority as traffic hazards.

Users will log into the program locally, on the computer on which the system has been installed. Each user's login ID and scores for each use of the program will be saved in a local database. MySQL, or a similar database, will be used to query the data for a given user when he/she logs in for a repeated use of the system, and to plot subsequent results in relation to previous results.

System Users will interact with the apparatus via the pointing device, e.g., a mouse or a touch pad, which they will manipulate to point at objects in the dynamic video display they judge to be "important to pay attention to, to stay safe while driving." This instruction is presented to a system User through introductory 'pages' shown on the computer display. Instructions are presented as text on screen and are also presented aurally.

When a User begins to interact with the system, he/she views a brief video animation culminating in a title screen that identifies the system by name, Expert Search and Scanning Skills, and bears a system logo (a stylized 'ES3') and, optionally, the name and/or logo of an organization that is licensed to use the system for its own use. The title page automatically advances to the first instruction page after a brief delay. From the first page instruction page onward, the User actuates a virtual 'Continue' button with the pointing device to navigate through one page after another until all of the instructions for using the system have been presented.

The instructions describe to a User how he/she will interact with the system 1) to accomplish an assessment of his/her ability to demonstrate, and/or 2) to receive training to improve such ability in, "expert search and scanning skills." These instructions provide a preview of the types of (dynamic driving video) displays the User will see while interacting with the apparatus; state and restate the consistent goal of the User to "point to whatever you see that is important to pay attention to, to stay safe while driving;" explain how to use the pointing device to carry out this instruction ("point only, do not click"); and emphasize that, as there are many different things one must pay attention to, to stay safe while driving, the User must expect to constantly shift his/her focus of attention and therefore to constantly change what he/she is pointing to, from one moment to the next. "Safety targets" and "safety threats" are explained, and the User is informed that his/her scores that result from interacting with the apparatus will, using various assessments or measures, reflect how many safety targets and safety threats he/she did point to over the duration of the dynamic driving video.

After receiving instructions in how he/she will interact with the apparatus, the User is provided with examples of how the dynamic driving video appears, including an overlay of the "focus-of-attention overlay" (FOAO) dot, which is a small bright dot which moves congruently with the pointing device, signifying the object to which a User is pointing while the video is displayed. The movement of the FOAO dot in this example is predetermined (stored); as it is for demonstration purposes only and is not under the control of the User. The driving video employed in the example is not used for assessment or training purposes.

Following the instructions and examples, the User receives a prompt asking him/her to click a virtual 'Continue' button on the page to begin one of a number of stored dynamic driving video image sequences for display on the computer screen where he/she will manipulate the pointing device to "point to whatever you see that is important to pay attention to, to stay safe while driving." The User will repeatedly perform this action of scanning, recognition and pointing throughout the duration of the dynamic driving video.

At the completion of the dynamic driving video, the User is presented with a scoring and results menu that gives an overview of the different measures of his/her performance that the system can report. The results menu provides the User with the option to allow the system to proceed through reports for each assessment or measure in a preprogrammed sequence (recommended), or to select or 'jump' to the report for one measure or another at the User's discretion. Virtual buttons are provided on individual pages allowing the User to move sequentially from one to another, or to return to the scoring and results menu.

After viewing the reports of his/her performance available in the scoring and results menu, the User is presented with feedback that interprets his/her performance in relation to the hypothetical best performance possible when interacting with the apparatus—namely, pointing to every safety target and safety threat on every frame of the dynamic driving video as identified and labeled in the Expert-derived "instantaneous object position and status" (IOPS) file. The IOPS is a reference file used by the system in measuring the User's performance.

Figure 1:
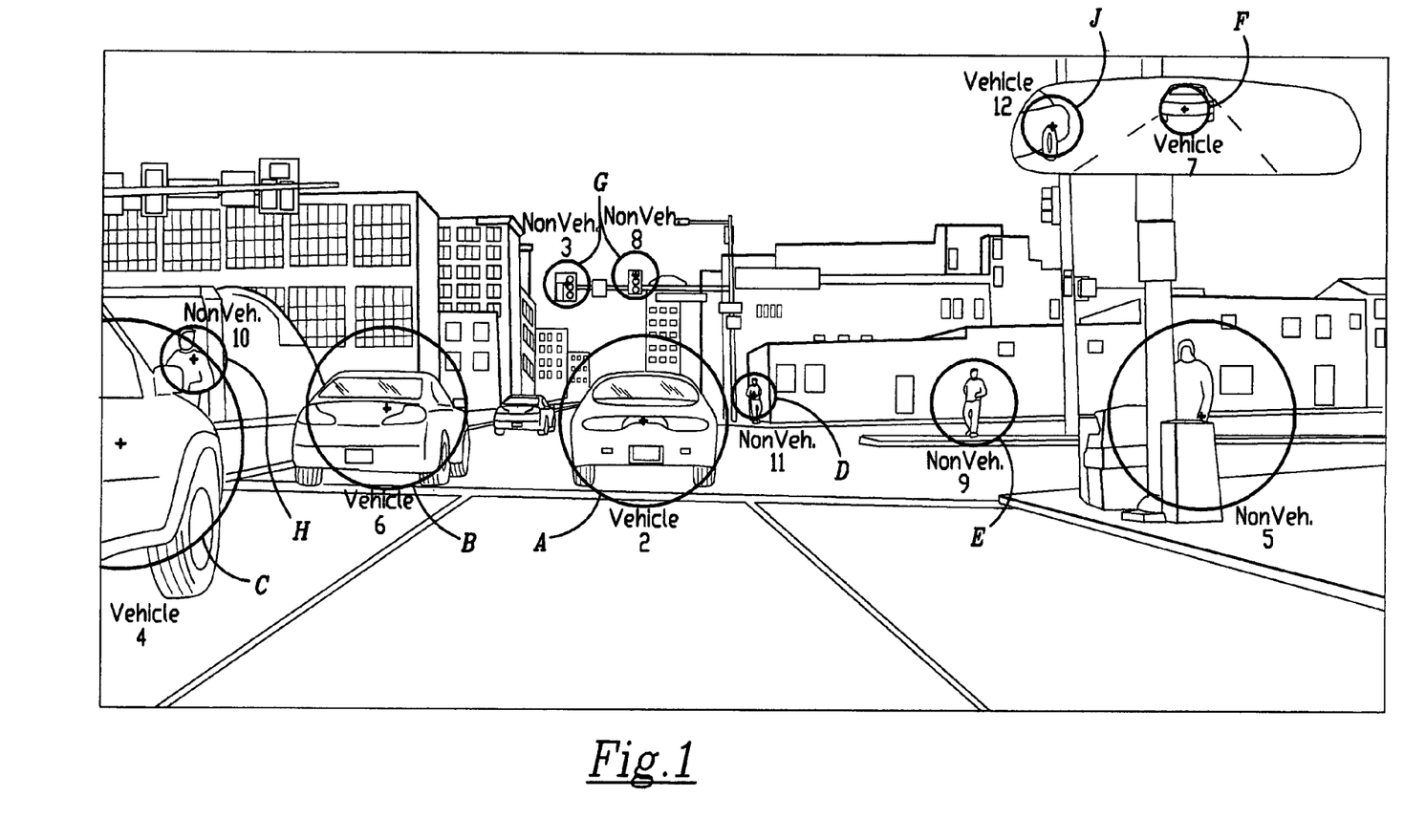
FIG. 1 is a perspective view, presented in a single frame of video imaging, of a city street scene having vehicular and pedestrian traffic in both directions, as well as potential for turning vehicles and cross-traffic at intersectional crossings representing the scene as viewed by a test subject using the present invention at a Time t1.

Referring now to the drawings in detail, where like numerals refer to like parts or elements, there is shown in FIG. 1 a city street scene having vehicular and pedestrian traffic in both directions, as well as potential for turning vehicles and cross-traffic at intersectional crossings representing one instantaneous scene, at Time t1, as viewed by a test subject using the present invention. The video images displayed by the system are full motion (30 frames/second) video, shot in high resolution from a moving vehicle traversing the actual city street scene as displayed to the User, although at an earlier time. While the user is watching the screen two camera views are displayed. The first is a view of the forward driving scene as viewed from a driver's-eye perspective; and the second is a view of the rearward driving scene as it appears in the inside rearview mirror located up and to the right of a driver's typical seating position. The rearview mirror view is superimposed on the forward view through image processing to result in a combined image showing both views of the dynamic forward and rear driving scenes as the video images are sequentially displayed.

Within the dynamic driving video, having both the combined front windshield and rear mirror views, every frame contains multiple objects visible to the driver that those knowledgeable in the field of traffic safety recognize as 'safety targets.' A safety target is operationally defined as any object that provides momentary information to a driver that he/she can employ to safely control his/her vehicle. Such objects include, but are not limited to:

Other vehicles;
Pedestrians and cyclists;
Animals in or near the roadway;
Traffic signs posted over or next to the roadway that regulate or prohibit drivers' movements (e.g., stop sign, speed limits, no left turns), that
warn of hazardous conditions ahead (e.g., curves),
provide lane assignment for upcoming maneuvers (e.g., a 'turn only' lane, an exit sign on a highway),
indicate changes in normal operations (e.g., road construction activities, detours); or
identify special circumstances (e.g., school zones, rail crossings);
Traffic signals posted over or next to the roadway;
Markings on the pavement that regulate or prohibit drivers' movements (e.g., left turn arrows);
Objects/debris in the road large enough to cause damage if struck, or to cause a motorist to abruptly brake or steer to avoid;
Objects or materials near the road with the potential to fall, roll or otherwise intrude into the driver's path; and
Features of the built-up environment in or near the driver's path that represent serious hazards if not perceived in advance (e.g., a bridge abutment, a large pothole in the pavement).

Safety Targets that may, or may not, be present in the Driving Scenes represented in FIGS. 1 and 2 at the respective Times t1 and t2 and their individual Driving Priority ratings are set out in TABLE 1 below.

TABLE 1

| Object Type/No. | Description of Safety Target/Threat | Priority Level t1 | Priority Level t2 |
|---|---|---|---|
| 1 | Pedestrians - group of 3 or 4 on the right sidewalk, standing (not shown) | n/a | n/a |
| 2 | Lead vehicle in front of User | high | low |
| 3 | Traffic signal on left side on overhead bar extending over the intersection | high | low |
| 4 | Another vehicle in adjacent lane on the left side farther ahead of the User, (not shown at time t2) | high | n/a |
| 5 | Pedestrian behind a pole approaching from the driver's right side, (not shown at time t2) | high | n/a |
| 6 | Another vehicle next to the lead vehicle ahead of the driver on the left side | low | high |
| 7 | Another vehicle following User (shown in rearview mirror view) in the same lane, within a close following distance | high | low |
| 8 | Traffic signal on the right side of overhead bar extending over the intersection | high | low |
| 9 | A single pedestrian walking in the same direction as User, on the right sidewalk | high | high |
| 10 | A pedestrian standing in the median of the roadway located on left ahead of User, (not shown at time t2) | high | n/a |
| 11 | A pedestrian walking in the same direction as User across the intersecting roadway, (not shown at time t2) | high | n/a |
| 12 | A vehicle following the user in an adjacent lane located on User's left side and visible in rearview mirror | low | low |
| 13 | No left turn sign-on overhead bar between traffic signals, (not shown at time t1) | n/a | low |
| 14 | Regulatory traffic sign-on light pole at right side of roadway, (not shown at time t1) | n/a | low |

TABLE 1-continued

| Object | | Priority Level | |
|---|---|---|---|
| Type/No. | Description of Safety Target/Threat | t1 | t2 |
| 15 | Trash can, tipped over, potentially rolling into driver's path (not shown at time t1) | n/a | low |

Figure 2:
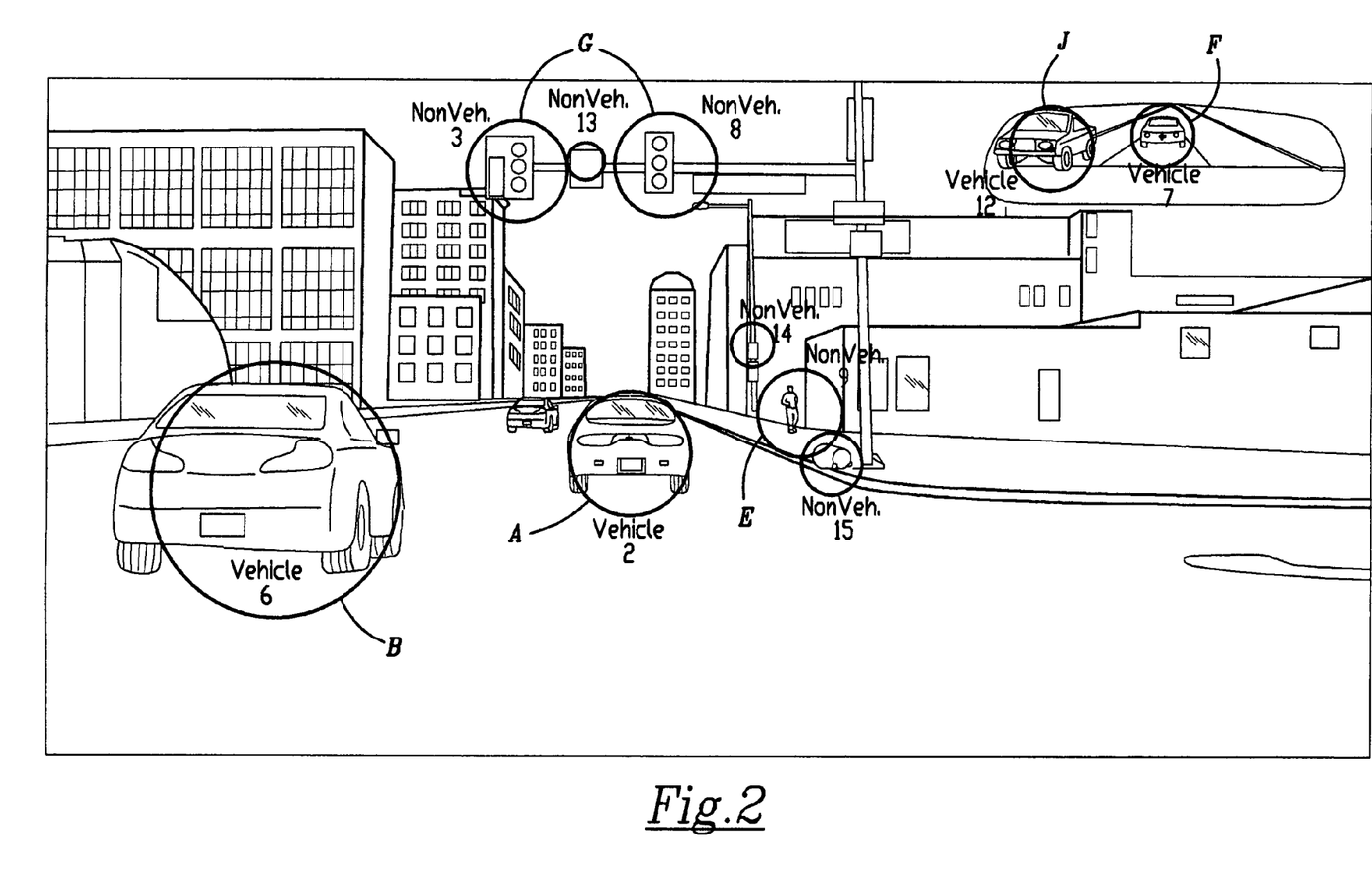
FIG. 2 is a perspective view, presented in a single frame of video imaging, of a city street scene having vehicular and pedestrian traffic in both directions, as well as potential for turning vehicles and cross-traffic at intersectional crossings representing the scene as viewed by a test subject using the present invention at a Time t2.

There are shown in FIG. 1 several examples of safety targets that appear on the dynamic driving video at Time t1, and may change position, appear or disappear at Time t2 in FIG. 2. These safety targets and/or threats are discussed below in relation to the respective drawing figures with each of the respective numbers of the objects correlating to the object descriptions of TABLE 1 above.

Object A is the vehicle directly in front of the User, identified further as Vehicle 2, which has a high priority ranking in FIG. 1 for the reason that it is directly in front of the User in the same travel lane. Object B is a vehicle in an adjacent lane on the User's left side, further identified as Vehicle 6, but sufficiently farther ahead of the User and in a different travel lane, which ranks the object with a low priority. Object C is also a vehicle in the adjacent lane on the User's left, identified further as Vehicle 4, but only slightly ahead of the User, resulting in a high priority level because it is immediately within the turning/lane changing range of the User. Object D is a single pedestrian, NonVeh 11, walking in the opposite direction as the User and, located at a point on the right side pedestrian walkway just about to step off the curb to cross the intersecting roadway, resulting in a high priority ranking. The high priority ranking is due to the position of the pedestrian, in front of the User, and the lack of knowledge about the exact path the pedestrian will take until the User passes him. Object E is a single pedestrian, NonVeh 9, walking in the same direction as the User, located on the median strip of the cross-street, and appearing to be walking into the cross-street in the same direction of travel to the User, but still in front of the User, resulting in a high priority ranking. Object F is a vehicle, identified as Vehicle 7, following the driver in the same lane, with a relative close following distance, which is visible in the driver's rear view mirror. Since the object is directly behind the User, the object is accorded a high priority ranking. Object G is a combination of the two traffic signals mounted on the bar extending over the travel lanes on the far side of the intersection, further identified as NonVeh 3 and NonVeh 8, having a high priority ranking due to their control of the travel lanes and the vehicles occupying those lanes. Object H is a pedestrian, NonVeh 10, positioned on the center median of the street being traveled by the User, and ranked as a high priority for the reason that this pedestrian is at the crosswalk and may attempt to cross in front of the User. Object J, further identified as Vehicle 12, is shown in the rearview mirror as approaching in the adjacent lane to the left and rear of the User's vehicle, and ranked as a low priority.

At any given time there may be fifteen (15) to thirty (30) safety targets, or safety threats depending upon their respective proximity and location, appearing on the screen for the User to locate and discern their respective importance. The User must engage the pointing device mechanism to identify these targets on a repeating basis as the video sequences through its playing time. The circles shown in the drawing figures surrounding the various target images are positioned to approximate circumscribing these images to represent the interactive target areas within which the User must move the pointing device icon in order to properly indicate the target was noted as important throughout the video playing time. The low priority safety targets and the high priority safety threats may also be indicated or shown by any geometric shape that is capable of substantially encompassing the object; for example, a circle (as shown in the figures), a square, a triangle, etc. The displayed shape is merely a representation of the interactive area representing the target object. During the assessment or testing phase, none of the geometric shapes, in this instance circles, are visible to the User. Only when the exercise is completed and the User is stepping through the Results, to be described more fully below, does the User actually see the 'circle' denoting the interactive target areas showing the target locations on the video and the priority levels accompanying the targets at the precise time in the video image sequence.

Thus, during the assessment or testing phase, as the User moves the pointing device immediately adjacent or within the interactive target area, the representative shape will not appear to show the User that the target object has been identified. Please note that whatever geometric shape is utilized, that shape should be consistent throughout so that individual targets have proportionally similar responsive representative target areas during the playing time of the video. Also, the overall size of the shape may vary as the size of the target object image, larger for closer targets and smaller for targets farther away.

In FIG. 2, the same city street scene having vehicular and pedestrian traffic in both directions is shown that was viewed by a test subject using the present invention, but at a subsequent Time t2. Time t2 is a length of time arbitrarily selected at a point in the sequence of video images that follows the first street scene image of FIG. 1. The safety targets have now shifted in spatial location in the User's view and, due to this spatial shift, may have changed from high to low priority, if they are no longer a hazard or threat, or shifted from low to high priority as the User is approaching the various targets. For example, Object B (Vehicle 6) is now closer to the User and has changed from low to high priority, becoming a safety threat. Object A (Vehicle 2) has changed from a high priority to a low priority target because it is now farther away from the User. Objects C (Vehicle 4) and D (NonVeh 11) are no longer visible to the User in the t2 timeframe of FIG. 2. Object E (NonVeh 9) remains a high priority safety threat as the pedestrian walks along the right side pedestrian walkway ahead of the User. Objects F (Vehicle 7) and G (NonVeh 3 and NonVeh 8) have changed from high to low priority in the t2 timeframe due to their change in proximity to the User. Object H (NonVeh 10) is no longer visible to the User at Time t2 and is no longer ranked with a priority. Object J (Vehicle 12) has dropped back but is still approaching from the rear in the travel lane adjacent and to the left of the User's path of travel, but is still far enough away to only rank as a low priority.

Figure 3:
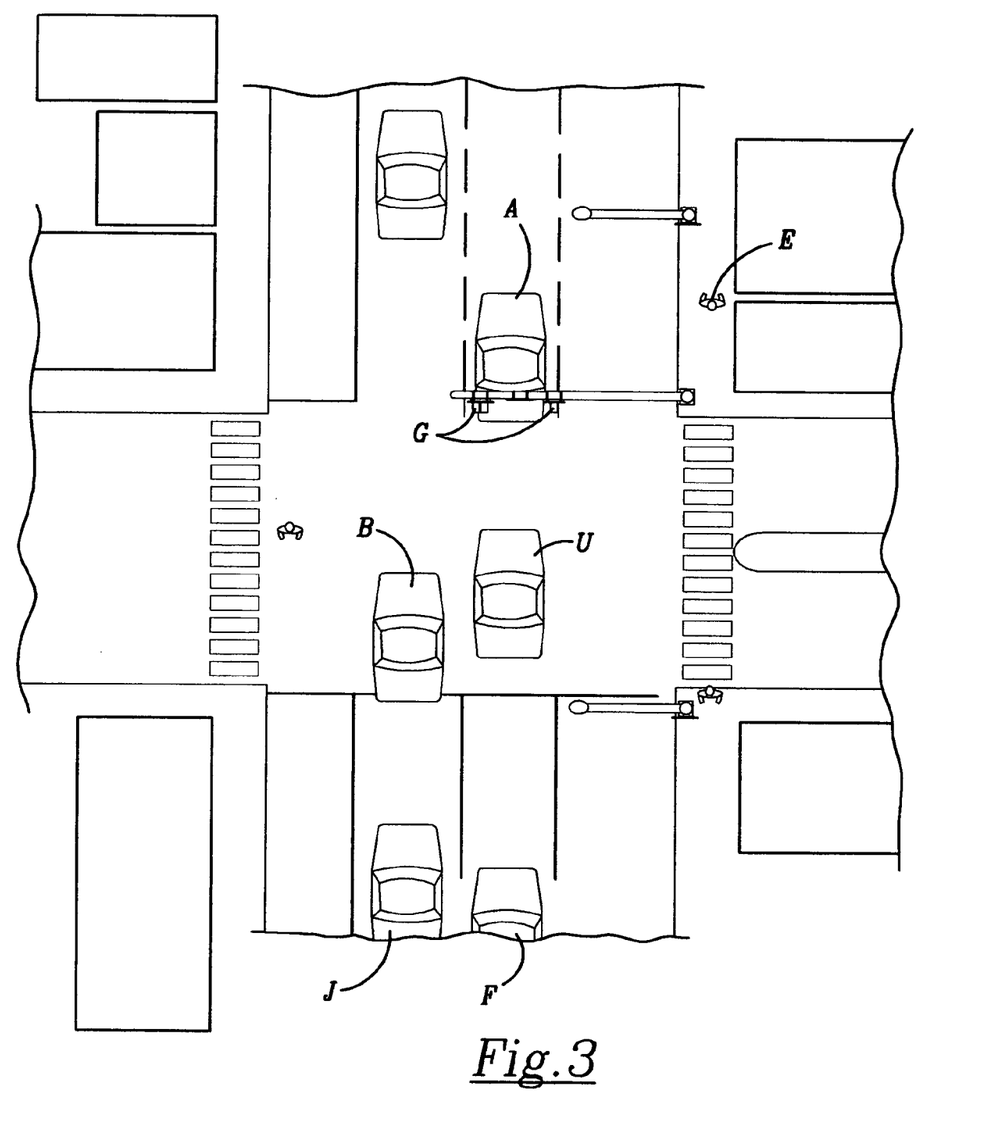
FIG. 3 is an overhead plan view of the street scene at Time t2.

FIG. 3 provides an overhead plan view of the street scene at Time t2, showing the relative positions of the different target objects that may impact the search and scan viewing assessment of one or more objects that may become more or less important to the User's travel path during the driving training session. The Object identification of FIG. 3 parallels those Objects appearing in FIG. 2.

The safety targets/threats that appear at Time t1 and Time t2 depend upon the User's speed, lane position, and User's vehicle's proximity to that object. Any 'safety target' may also be identified as a 'safety threat' and an object assigned the status of 'safety threat' may revert to 'safety target' as the result of its relative motion and/or position to the User's vehicle from one moment to another. A 'safety threat' is of relatively higher priority because of its size, speed, proximity, or other attribute(s) that connotes immediate and significant potential to result in a crash if not heeded by the driver. All object targets have been assigned a unique reference number. When a target is no longer in view, as when the User passes a fixed object, the number assigned to that object is not used again to identify a different object.

The status of objects visible in the front windshield and rearview mirror views in the dynamic video as safety targets, safety threats, or neither is labeled electronically in the IOPS file. From one frame of video to the next, the objects and their associated labels in the IOPS file are likely to differ, as objects identified in the preceding frames as safety targets have moved and/or are relabeled as safety threats, or vice versa; or as objects first become visible as safety targets (e.g., a pedestrian stepping out from behind a parked vehicle); or as objects identified as safety targets in preceding frames either disappear from view (e.g., a lead vehicle turns off the road into a parking lot) or attain such a degree of separation in the driving video, that those knowledgeable in the field judge that the information they provide is no longer necessary or useful for safe vehicle control at that instant.

Every safety target and every safety threat visible to the driver, as so labeled in the IOPS file, is located in the video frame as a pixel address (horizontal and vertical coordinates) and a diameter (a number of pixels) that completely contains the object. On successive frames both the pixel address and diameter associated with a given safety target or safety threat must change, unless there is no motion whatsoever; this occurs only rarely, at a red light. Otherwise, because of the dynamic nature of the video, the array of object locations coded as pixel addresses plus diameters in the IOPS file is different for every frame.

For each frame of dynamic video, object locations (pixel address plus diameter) and their status as safety targets or safety threats are assigned through independent ratings by at least three "Experts" distinguished as researchers or educators in the field of traffic safety. At least two of the three Experts must agree for any object visible in the front windshield or rearview mirror driving scene to be labeled a safety target. Similarly, for a safety target to be elevated to a safety threat, it must be so labeled by two of the three Experts.

Such designation of visible objects as safety targets or safety threats is accomplished through an interaction of the pointing device with the dynamic video, using the processing capacity of the system's CPU. When an Expert views the dynamic driving video, he/she "aims" the pointing device at a particular location (pixel address) by positioning a crosshair overlay on the driving video on the location of choice, while using an auxiliary control on the pointing device (e.g., a scroll wheel on a mouse) to increase or decrease the diameter of a circle centered on the location of choice until it just encloses an entire object visible in the driving scene. By using another auxiliary control on the pointing device (e.g., a button on a mouse) the relative safety priority of the object is designated, i.e., it is labeled as a 'safety target' or a 'safety threat.'

This exercise is performed over and over, selecting and reselecting one object at a time while the video is playing, until every object in every frame of video deserving to be labeled as a safety target or safety threat in the judgment of each Expert has been so located and so designated. These pixel addresses plus diameters, that together locate objects, and their associated labels as safety targets or safety threats, are stored electronically in the IOPS file for every frame of dynamic video; this results in a composite video where the IOPS information is represented as color coded circles (one color for safety targets, another for safety threats) superimposed on the original dynamic driving video, and this composite video may itself then be played in full (continuous, i.e., 30 fps) motion.

The pointing device also interacts with the dynamic video when used to assess or train a system User, though in a different manner than when used by an Expert to record the pixel addresses and diameters of objects, and label them as safety targets or safety threats. System users merely point with the pointing device, they do not click, scroll, or use any auxiliary controls on the pointing device—at whatever objects they judge to be "important to pay attention to, to stay safe" while driving. This judgment changes continuously, as what the User sees in the dynamic video changes; accordingly a User continuously moves the pointing device, which causes a small, bright dot—the focus-of-attention overlay (FOAO)—to move congruently with the movement of the pointing device, within the boundaries of the video image.

The movement of the pointing device by a User (and associated movement of the FOAO dot as an overlay on the dynamic video image) results in the creation of a User Search and Scanning Performance file (USSP) by the system. This USSP file provides a record of the User's focus of attention every $\frac{1}{30}$ of a second (every frame) as he/she interacts with the dynamic driving video, and in turn enables all system scoring and feedback functions. It also results in a composite video where the USSP information—in the form of the FOAO dot—is superimposed on the original dynamic driving video, and this composite video may itself then be played in full (continuous, i.e., 30 fps) motion.

Figure 4:
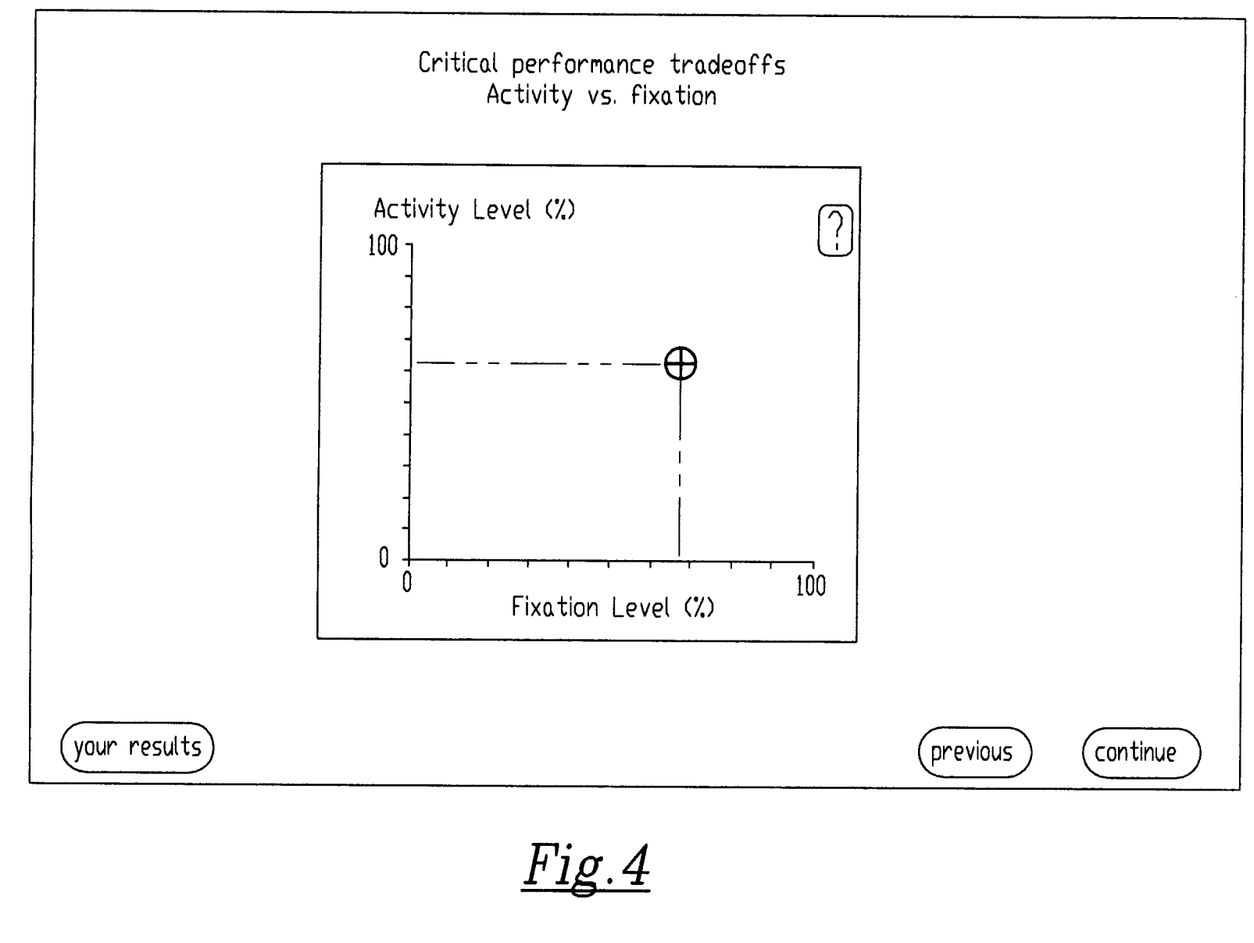
FIG. 4 is a graphical representation of Activity vs. Fixation of the test subject following a typical test session using the present invention.

FIG. 4 is a screenshot of a graphical representation of ACTIVITY vs. FIXATION of the test subject following a typical test session. The tradeoff between the 'activity' versus 'fixation' is indicated by any point that lies within the area of the graph indicating that an individual scored fifty (50) percent or better on each measure. Over successive uses of the program, feedback will be provided to encourage maintenance of a high activity level, while continually improving the fixation percentage as well as the percent of targets (and especially high priority targets) that are recognized. A "fixation" is defined as a cursor change of less than a 100 pixel radius between frames of video. The "fixation %" and the "activity %" are calculated as follows:

Activity (%): If the X or Y position of the cursor on the current frame is different from the X or Y position on the previous frame, the pointer was moved. These frames are summed up and divided by the total number of frames in the clip.

Fixation (%): If the (X, Y) position of the cursor on the current frame is less than a radius of 100 pixels away from (X, Y) on the previous frame, then the frame is counted as a fixation.

If pointer movement is slow enough, activity and fixation can both occur on a particular frame. Thus, these measures are not mutually exclusive, and it is possible for more than fifty (50) percent of the frames to represent both 'activity' and 'fixation.' The user who achieves high scores on both of these measures, while recognizing a high percentage of safety targets, is re-directing his or her attention rapidly and accurately to the most appropriate objects/locations in the driving scene. The graph presented as FIG. 4 shows an Activity Level of approximately 62 percent and a Fixation Level of approximately 67 percent. This could be interpreted as indicating a slight lag in a User's moving the pointing device from one target to another since the Fixation percentage is slightly greater than the Activity percentage.

The tracking of the movement of the safety threats and safety targets on the screen and within a specific region of the screen is achieved through the use of dynamic coordinates for the pointer position and the location of all safety threats/targets on each frame of the video are all indexed in an array (data structure) via an integer that corresponds to the frame number of the currently open video. This guarantees a lock between tracking data and a particular frame of video. The user's pointer movements (X, Y location of the cursor over the 1280×680 driving scene saved at 30 Hz for every frame of video, with cursor position displayed to the user as a dot) are saved in an array or data structure. The number of pointer fixations (movement less than the threshold pixel radius) and the pointer activity are accumulated separately. At the end of a video clip, a binary file is loaded into memory containing the centers and diameters of all of the vehicle and non-vehicle objects identified as targets, with either high or low priority levels assigned by experts. These are then compared to the log of pointer movements (cursor coordinates) to determine whether the user's cursor was inside of the object area for a particular frame. These frame-by-frame scores are then accumulated across all frames and across object types to obtain the various scores that are calculated for each video clip. Also, the log of the user's pointer movements is compared to the zone coordinates, supporting calculations of the percent of time he/she positioned the pointer within each zone.

Figure 5:
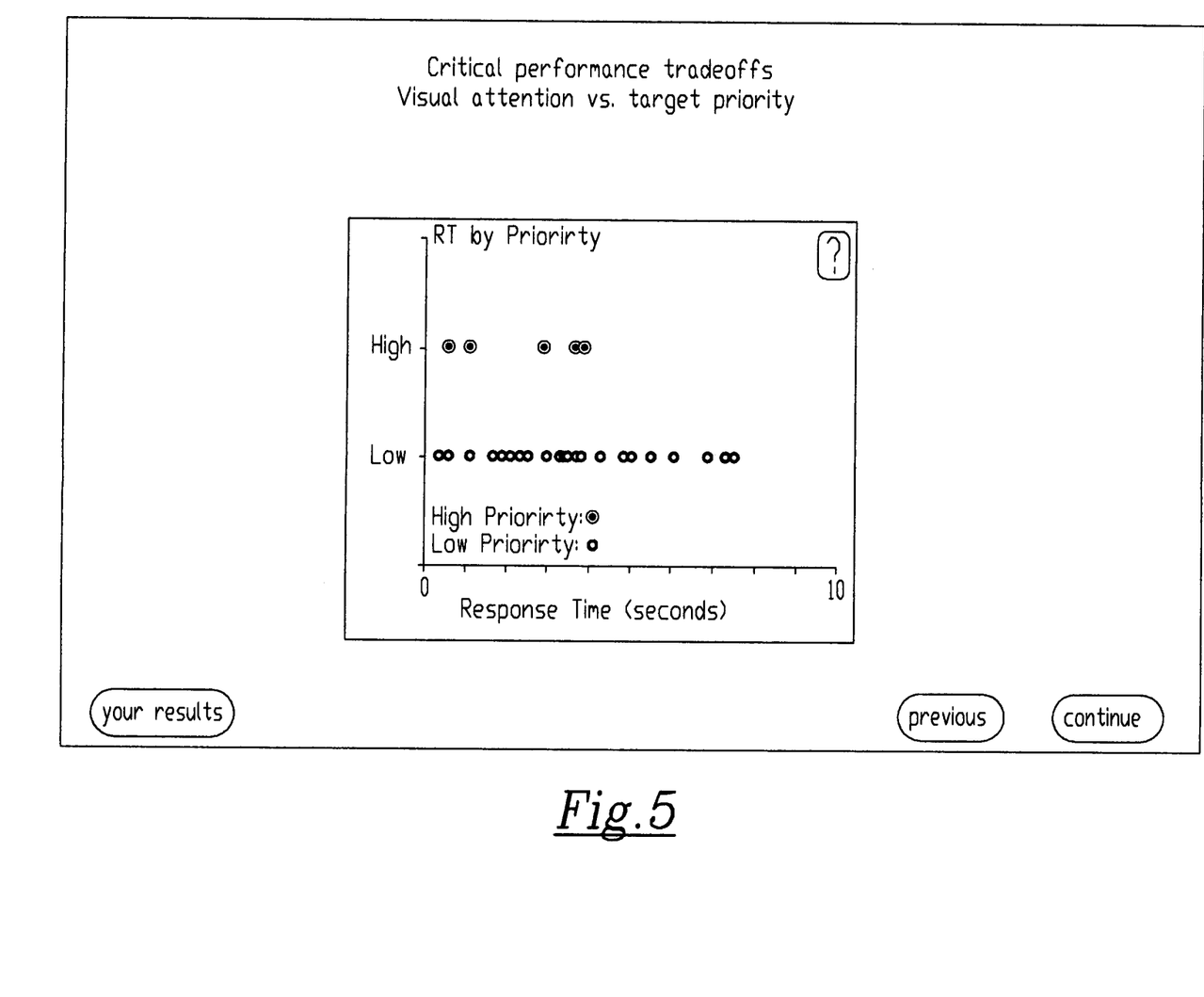
FIG. 5 is graphical representation of Visual Attention vs. Target Priority of the test subject following a typical test session using the present invention.

FIG. 5 is graphical representation of VISUAL ATTENTION VS. TARGET PRIORITY of the test subject following a typical test session. This report contrasts the User's recognition time and fixation time for "high priority" objects (safety threats) versus "low priority" objects (safety targets) that he/she successfully identified in the dynamic driving video. Recognition time is defined as the amount of time from the first video frame where an object that experts have determined is a safety target or threat is visible to the video frame where the User manipulated the pointing device to place the FOAO dot within the representative object area marking the location of the target/threat. Using this measure, an average recognition time is calculated and reported for high priority objects (safety threats) only, low priority objects (safety targets) only, and both sets of objects combined. Similarly, an average fixation time is calculated and reported for high priority objects (safety threats) only, low priority objects (safety targets) only, and both sets of objects combined, which informs the User how long his/her attention remained focused on a given category of objects. Finally, the User is presented with a plot showing his/her recognition times (RTs) for individual objects (instead of averages for categories of objects) on which the User fixated in the dynamic driving video.

Using the pointing device, the User can select any object— for example, an object that he/she was especially quick, or especially slow to recognize—and go to the frame in the video where that object first appears. This is accomplished by moving the pointing device icon over the 'circle' of either a 'high priority' or 'low priority' RT, clicking the pointer button to obtain a replay of the several video frames that lead up to the recognition. A replay of the dynamic video begins from the first appearance frame, and continues until the frame where the User has succeeded in placing the FOAO dot on the object by manipulating the pointing device.

Figure 6:
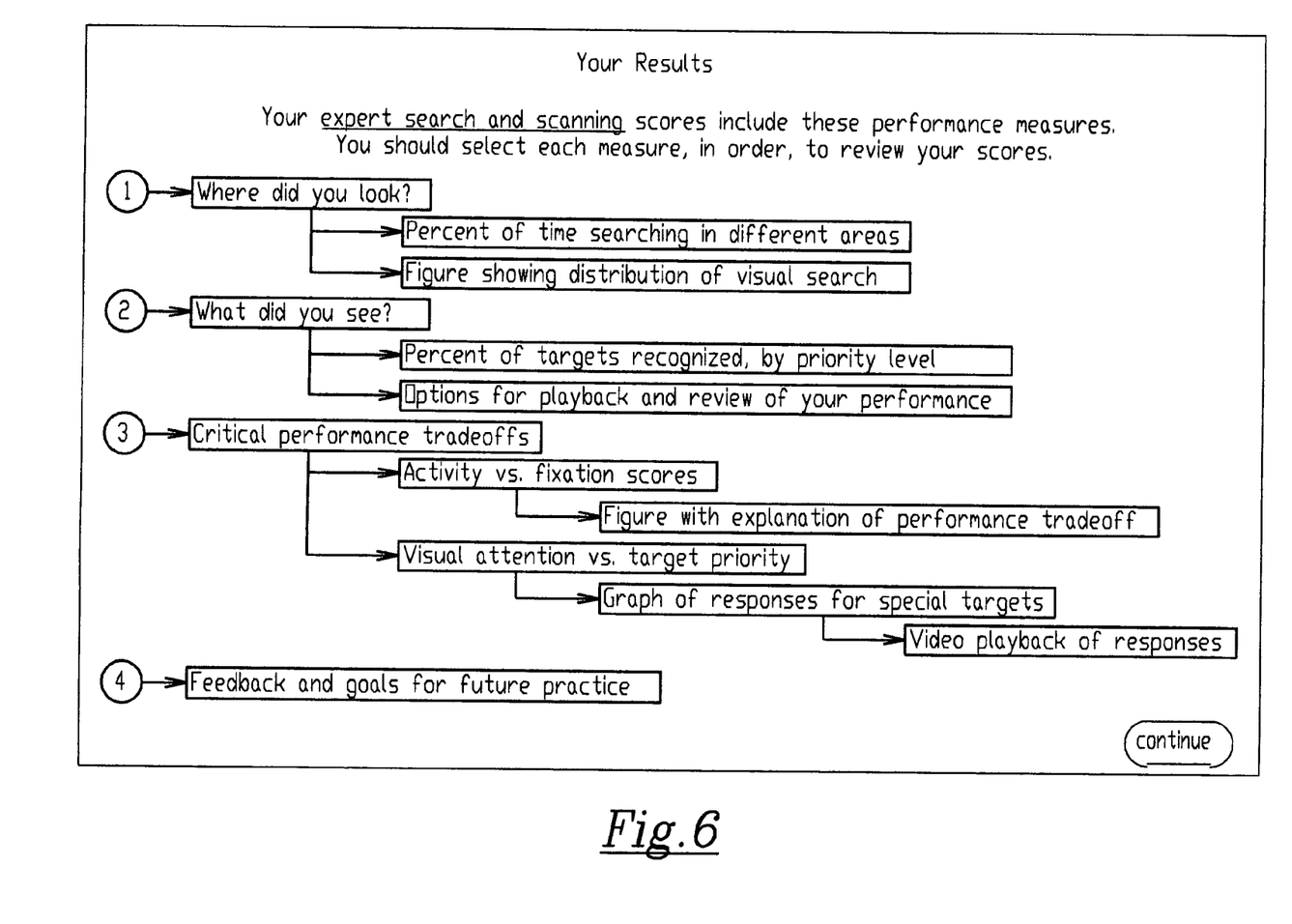
FIG. 6 is a screen-shot of the Results Page following a typical test session with links to various images of recorded testing of the subject using the present invention.

FIG. 6 is a screen-shot of the Results Page following a typical test session with links to various images of recorded testing of the subject using the present invention. The statistics compiled for each use, each time the User completes the pointing exercise for a driving video include four different areas and can be explained as follows.

1. "Where Did You Look?" This result is the percentage of time the pointing device was directed by the User to locations within predefined boundaries, or zones, within the dynamic driving scene. These five areas or zones of the driving scene are as follows:
    (a) Directly ahead, near: within two (2) car lengths, roughly symmetrical and centered on driver's perspective;
    (b) Ahead, (far): centered on the driver's perspective, more than two (2) car lengths ahead with roughly symmetrical areas on either side;
    (c) Left: left-side triangular notch in the field of view encompassing an area slightly left of center and above/below the horizon line;
    (d) Right: right-side triangular notch in the field of view encompassing a slightly right of center and above/below the horizon line; and
    (e) Rearview mirror: a portion of the upper-right corner of the field of view where the mirror overlay was placed.

The calculation for all zones is the percent of total frames where the pointing device is directed within the predefined area. All percentages are calculated to add up to 100%. These scores are presented to the User on the display, in a tabular format; and also by presenting the screen view, as shown in FIG. 1 for example, with the scores superimposed on their respective zones.

2. "What Did You See?" This result reports the percentage of safety targets recognized (pointed to) by the User, both overall and in terms of their priority level (high versus low). Furthermore, the specific safety targets and safety threats recognized (and missed) by the User are identified. This is accomplished by playing back the dynamic driving video showing all safety targets and safety threats marked with color-coded circles, as described earlier. At the User's discretion, the playback options also allow superimposing the FOAO dot (that the User controlled by manipulating the pointing device) to show where the User was pointing at each moment. By viewing these two types of information simultaneously—the target information from the IOSP file and the User's pointing behavior from the USSP file, both displayed during playback of the dynamic driving video— the User can perceive directly which targets and threats he/she recognized and which ones he/she did not.

3. "Critical Performance Tradeoffs." This result conveys information to the User about his/her search and scanning strategy, using two types of reports. The first report is described in terms of the mutually exclusive pointing behaviors 'fixation' and 'activity.' A fixation occurs when the FOAO dot was moved less than a threshold amount (number of pixels) relative to its position on the previous video frame. The User's 'fixation score' reports the percent of video frames within the dynamic driving video where this behavior occurred. By contrast, the User's 'activity score' reports the percent of video frames where the FOAO dot did move relative to the previous frame, regardless of the amount of movement, via the User's manipulation of the pointing device.

A plot of the fixation score and activity score on a 2-D graph (with the diagonal as a reference) is presented to the User to report how well he/she balances these two competing behaviors when searching for safety targets and safety threats in the dynamic driving video. Greater numbers of safety targets and safety threats will be recognized when the User points to an increasing number of locations overall during the dynamic driving video and when an increasing percentage of the locations pointed to contain targets/threats. An optimal tradeoff between activity and fixation is represented by a plot on the 2-D graph that lies along or just above the diagonal reference line, as far as possible from the origin (0,0) of the 2-D graph.

The second report contrasts the User's recognition time and fixation time for "high priority" objects (safety threats) versus "low priority" objects (safety targets) that he/she successfully identified in the dynamic driving video. Recognition time is defined as the amount of time between an object first becomes visible in the video and the time the User manipulated the pointing device to place the FOAO dot within the representative object area marking the location of the target/threat. Using this measure, an average recognition time is calculated and reported for high priority objects (safety threats) only, low priority objects (safety targets) only, and both sets of objects combined. Similarly, an average fixation time is calculated and reported for high priority objects (safety threats) only, low priority objects (safety targets) only, and both sets of objects combined, which informs the User how long his/her attention remained focused on a given category of objects.

A desirable result is that the User is both faster to recognize high priority objects than low priority objects, and that he/she spends more time fixated upon high priority than low priority objects. Finally, the User is presented with a plot showing his/her recognition times (RTs) for individual objects (instead of averages for categories of objects) that the User fixated in the dynamic driving video. Using the pointing device, the User can select any object—for example, an object that he/she was especially quick, or especially slow to recognize—and go to the frame in the video where that object first appears. A replay of the dynamic video begins from that frame, and continues until the frame where the User has succeeded in placing the FOAO dot on the object by manipulating the pointing device.

4. "Feedback and goals for future practice" are displayed on the screen. After all scores and results have been presented, the User, as an option, may view and print a summary page containing an overview of the measures of performance from the "Where did you look?"; "What did you see?"; and "Critical performance tradeoffs" sections of the scoring and results menu. This body of information is accompanied by individualized feedback for the User, consisting of text that interprets the User's performance in relation to stated performance goals, and provides suggestions and strategies designed to improve performance on subsequent interactions with the Expert Search and Scanning Skills system and, by extension, to improve these skills when operating a motor vehicle.

Users are not timed as they interact with the system; the exercises are self-paced. If the system is used for assessment, a user may interact with it only once. If the system is used for training, users will interact with it repeatedly over hours or days; however, no specific requirement for the maximum or minimum interval between users of the system for training purposes has been established.

The CPU is an off-the-shelf component characterized—by the following minimum performance specifications: Intel Core 2 Duo T9300 (or better) at 2.5 GHz operating speed, with 3 GB of (preinstalled) RAM. The graphics card or chip set is an off-the-shelf component characterized by the following minimum performance specifications: Intel 965 chip set (or better). The hard drive is an off-the-shelf component characterized by the following minimum performance specifications: 5 GB storage and 7200 RPM disk access speed. The display is an off-the-shelf component characterized by the following minimum performance specifications: high-definition video aspect ratio, liquid crystal display (LCD) with WXGA resolution, 16-bit color, and 60 Hz refresh rate. The pointing device is an off-the-shelf component characterized by the following minimum performance specifications: must provide continuous (non-discrete) positional information to system; must not produce any occlusion or obstruction of the display when used as designed. Physical connections between the CPU, hard drive, and display elements described above are wired. Physical connections between the CPU and the pointing device may be wired or wireless; if wireless, security features such as encryption and MAC address sharing must be enabled. The physical layout of the system requires that the CPU element be located behind, below, remotely from, or combined with the display element, so as not to obstruct the view of or distract attention from the display element when the system is in use. The display element may rest on a tabletop or be mounted on a wall or other structure such that it is at a height to be viewed in the direct horizontal line of sight of a comfortably seated system user. The pointing device rests on a planar surface that extends perpendicularly in front of the display, and is positioned at a height that is below the bottom edge of the display.

Data results from a User's interaction with the system via continuous sampling of the position of the pointing device throughout the duration of the dynamic driving video. These data are stored on the hard drive and saved as a text file in a folder created for each User. All data for a particular User is saved to this one folder. The User's data is labeled with a filename containing a personal identifier (alphanumeric), the date, time, and an identifier for the dynamic driving video. Within each file, the User's data are stored in lines. Each line of data includes the status of buttons displayed to the User, the X-position of the pointing device, the Y-position of the pointing device, the time relative to the beginning of the dynamic driving video, and the time converted to a video frame number.

As stated, the User is presented reports of his/her scores and results, plus feedback to interpret this information, after using the pointing device to interact with the system throughout the duration of the dynamic driving video. Results and feedback are presented on pages (screens) that the User views on the display. On each page devoted to providing results and feedback to the User, qualitative and quantitative information may be presented, using a combination of text, narrative, charts, tables, and graphs.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A method for permitting the measurement of a combination of visual and cognitive processes necessary for safe driving-object detection, recognition of particular objects as actual or potential safety threats or traffic hazards, and the continuous switching of visual attention between objects while driving according to their instantaneous priority as safety threats or traffic hazards, using a computing device including a high speed graphics card, an internal hard drive with high speed access, a monitor or display unit, and a pointing device, by a user comprising the steps of:

initializing the computing device to play a dynamic driving video to measure a user's skill in visually searching and scanning a roadway environment;

playing the dynamic driving video on the user's command to rapidly direct and re-direct the user's attention to objects in or near the user's virtual driving path according to the objects' priority as safety threats or traffic hazards;

moving an icon across the display under the user's command, said icon being superimposed on the dynamic driving video, to indicate how the user directs and redirects the attention to objects in or near the user's virtual driving path according to the user's perception of the objects' priority as safety threats or safety hazards;

dynamically storing the user's selection of objects by capturing the time and video frame imagery of each of the user selections of safety threat or traffic hazard objects, monitoring the length of time the user keeps the icon on a selected interactive target area representing one object and the number of times the user returns to the same selected interactive target area representing the same object, monitoring the length of time as the user moves the icon to a different interactive target area representing another object and the number of times the user returns to any of the previously selected interactive target areas representing objects, and storing all of the collected information for use in assessing and measuring the user's performance;

comparing the user's selection of objects against stored information obtained from acknowledged experts in this skill area; and     providing feedback to the user about the type, location, timing of search and scanning performance errors, and remedial strategies to correct such errors.

2. The method of claim 1, wherein the step of dynamically storing the user's selection of objects comprises the additional steps of:

creating interactive target areas that overlay the image display for each of the objects, which interactive target area automatically resizes as the size of the image of the individual object changes with the forward movement of the virtual vehicle along the user's virtual driving path as the dynamic driving video is shown on the display;

interacting with the display of the computing device via the pointing device to move the icon representing the position of the pointing device on the display to point at objects in the dynamic video display the user judges to be of instantaneous importance as a safety threat or traffic hazard, and     dynamically selecting the objects to be of importance as safety threats or traffic hazards in the dynamic driving video in real time by moving the icon over the interactive target areas for each of the objects.

3. The method of claim 1, wherein the step of providing feedback to the user comprises the additional step of:

displaying testing assessment results for the user with interactive links to graphical representations of analysis and measurement of performance skill of the user in detecting safety threats and traffic hazards in the dynamic driving video.

4. The method of claim 3, wherein the step of providing feedback to the user further comprises the additional steps of:

providing an overview of the different measures of the user's performance in the form of a results display by providing interactive links to each of several reports for each assessment or measure of the user's performance skill, and     accessing the several reports in a preprogrammed or user selectable sequence allowing the user to sequentially display one report after another, and then return to the results display.

5. The method of claim 4, wherein the step of accessing the several reports comprises the additional step of:

replaying the portion of the dynamic driving video immediately prior to the user selection of the safety threat or traffic hazard for the user to review.

6. The method of claim 1, wherein the step of comparing the user's selection of objects comprising the additional steps of collecting information by:

calculating the activity of the user in continuous switching of visual attention between objects that are deemed safety threats of traffic hazards;

calculating the fixation of the user on any selected object or objects;

tabulating the number of objects recognized by the user as safety threat or traffic hazard objects; and     determining the distribution of user search efforts for objects in different viewing areas.

7. The method of claim 6, wherein the collected information of user performance is compared to the stored information obtained from acknowledged experts for the same dynamic driving video to create unique reports of user assessment and performance.

\* \* \* \* \*

UNITED STATES PATENT AND TRADEMARK OFFICE
CERTIFICATE OF CORRECTION

PATENT NO. : 8,597,027 B2  
APPLICATION NO. : 12/592487  
DATED : December 3, 2013  
INVENTOR(S) : Staplin et al.

Page 1 of 1

It is certified that error appears in the above-identified patent and that said Letters Patent is hereby corrected as shown below:

On the Title Page

Item 76 should read ---- Item 75

Item 75 ---- Inventors should read

Loren J. Staplin, Allentown, PA (US); Kenneth W. Gish, Pipersville, PA (US)

Signed and Sealed this  
Twenty-fifth Day of August, 2015

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,597,027 B2 | Page 1 of 1 |
| APPLICATION NO. | : 12/592487 | |
| DATED | : December 3, 2013 | |
| INVENTOR(S) | : Staplin et al. | |

It is certified that error appears in the above-identified patent and that said Letters Patent is hereby corrected as shown below:

On the Title Page

Item (12) ---- should read STAPLIN, et al.

Item (76) ---- Inventors should read

Loren J. Staplin, Allentown, PA (US); Kenneth W. Gish, Pipersville, PA (US)

This certificate supersedes the Certificate of Correction issued August 25, 2015.

Signed and Sealed this
Tenth Day of November, 2015

Michelle K. Lee
*Director of the United States Patent and Trademark Office*